United States Patent [19]
Kolar et al.

[11] Patent Number: 5,892,352
[45] Date of Patent: Apr. 6, 1999

[54] SYNCHRONIZATION OF THE SWITCHING ACTION OF HYSTERESIS CURRENT CONTROLLED PARALLEL CONNECTED POWER ELECTRONICS SYSTEMS

[75] Inventors: Johann W. Kolar, Wien, Austria; Ned Mohan, St. Paul; Girish R. Kamath, Minneapolis, both of Minn.

[73] Assignee: Regents of the University of Minnesota, Minneapolis, Minn.

[21] Appl. No.: 873,628

[22] Filed: Jun. 12, 1997

Related U.S. Application Data

[63] Continuation of Ser. No. 664,779, Jun. 14, 1996, abandoned.

[30] Foreign Application Priority Data

Jun. 16, 1995 [AT] Austria ..................................... 1032/95

[51] Int. Cl.$^6$ ................................................... G01R 25/00
[52] U.S. Cl. ............................................. 323/213; 323/217
[58] Field of Search .................................... 323/205, 206, 323/207, 212, 213, 214, 217; 363/148, 149, 152

[56] References Cited

U.S. PATENT DOCUMENTS

| | | | |
|---|---|---|---|
| 4,737,703 | 4/1988 | Hayakawa | 323/213 |
| 4,858,100 | 8/1989 | Tatara | 323/212 X |
| 4,930,064 | 5/1990 | Tanaka et al. | 323/212 X |
| 5,051,684 | 9/1991 | Angquist | 323/207 |

FOREIGN PATENT DOCUMENTS

| | | |
|---|---|---|
| 32 31 945 A1 | 2/1984 | Germany . |
| 38 40 806 A1 | 5/1990 | Germany . |

OTHER PUBLICATIONS

Albach, M., and Dambois, D.: "Optimized Operation Mode for 3 KW Off–Line Preconditioner Circuits", *Proceedings of the 4th European Conference on Power Electronics and Applications*, Firenze, Sep. 3–6, vol. 3, pp. 3–134 – 3–139 (1991).

Miwa, B.A., Otten, D.M., and Schlecht, M.F.: "High Efficiency Power Factor Correction Using Interleaving Techniques", *Record of the 7th IEEE Applied Power Electronics Conference*, Boston, Feb. 23–27, pp. 557–568 (1992).

Seixas, C.M., and Barbi, I.: "Analysis of a Power Factor Correction System Employing the Multiphase Boost Converter Operating in Discontinuous Conduction at Constant Frequency", *Record of the 2nd Brazilian Power Electronics Conference*, pp. 207–212 (1993).

Balogh, L., and Redl, R.: "Power Factor Correction with Interleaved Boost Converters in Continuous–Inductor–Current Mode", *Record of the 8th IEEE Applied Power Electronics Conference*, San Diego, Mar. 7–11, pp. 168–174 (1993).

(List continued on next page.)

*Primary Examiner*—Peter S. Wong
*Assistant Examiner*—Y. J. Han
*Attorney, Agent, or Firm*—Westman, Champlin & Kelly, P.A.

[57] ABSTRACT

A method and apparatus for operation of an electrical power conversion system having first and second partial systems connected in parallel. Each partial system includes an inductor and an electronic switch for controlling electrical power transferred through the partial systems. A control circuit controls operation of the electronic switches. The control circuit includes devices for generating a first control signal error and a second control signal error as a function of a reference and current flowing in the inductors. Hysteresis devices receive the first and second control signal errors and provide first and second outputs, respectively, upon intersection of the first and second control signal errors with selected threshold values. Delay devices coupled to the electronic switches receive and delay transmission of the first and second outputs to the electronic switches.

10 Claims, 7 Drawing Sheets

OTHER PUBLICATIONS

Rippel, W.E.: "Optimizing Boost Chopper Charger Design", *Proceedings of the 6th National Solid State Power Conversion Conference,* Miami Beach, May 2–4, pp. D1–1 – D1–20 (1979).

Sebastiàn, J., Jaureguizar,M., and Uceda, J.: "An overview of Power Factor Correction in Single–Phase Off–Line Power Supply Systems", *Proceedings of the 20th International Conference on Industrial Electronics, Control and Instrumentation,* Bologna, Italy, Sep. 5–9, vol. 111, pp. 1688–1693 (1994).

Rossetto, L. Spiazzi, G., and Tenti, P.: "Control Techniques for Power Factor Correction Converters", *Proceedings of the 7th Power Electronics and Motion Control Conference,* Sep. 20–22, Warsaw, Poland, vol. II, pp. 1310–1318 (1994).

Zhou, C., and Jovanovic, M.M.: "Design Trade–Offs in Continuous Current–Mode Controlled Boost Power–Factor––Correction Circuits", *Proceedings of the 10th Annual Power Electronics Seminar,* Blacksburg, Sep. 20–22, pp. 57–67 (1992).

Dixon, L.: "Average Current Mode Control of Switching Power Supplies", *Unitrode IC Product and Applications Handbook 1993/1994,* pp. 10–398 – 10–411 (1993).

Henze, C.P., and Mohan, N.: "A Digitally Controlled AC to DC Power Conditioner that Draws Sinusoidal Input Currents", *Record of the 17th IEEE Power Electronics Specialists Conference,* Vancouver, Jun. 23–27, pp. 531–540 (1986).

Zhou, C. Ridley, R.B., and Lee, F.C.: "Design and Analysis of a Hysteretic Boost Power Factor Correction Circuit", *Virginia Power Electronics Center Publication Series,* vol. V, Switching Rectifiers for Power Factor Correction, pp. 7–14 (1994).

Lee, F.C., Borojevic, D., and Vlatkovic, V.: "Single–Phase Power Factor Correction Schemes", *Proceedings of the 10th Annual Power Electronics Seminar, Tutorial 1–1,* Blacksburg, Sep. 20–22, pp. 1–73 (1992).

Rippel, W.E.: "A New Coupled Inductor Two–Phase Switching Regulator Improves Device Utilization", *Proceedings of the 7th National Solid State Power Conversion Conference,* San Diego, Mar. 24–27, pp. E2–1 – E2–13 (1980).

Holtz, J., and Krah, J.O.: "Adaptive optimal pulsewidth Modulation for the line–side converter of electric locomotives", *Elektrische Bahnen eb.,* Jg. 88, H. 3, pp. 116–121 (1990).

Klinger, G.: "Tolerance Band Controlled Single Phase Converter Circuit with Minimum Interactions Between Converter and Supply by Optimum Control Parallel Operation", *Proceedings of the 2nd IFAC Symposium on Control in Power Electronics and Electrical Drives,* Düsseldorf, Germany, pp. 769–775 (1977).

Meyer, M. and Sonnenmoser, A.: "A Hysteresis Current Control for Parallel Connected Line–Side Converters of an Inverter Locomotive", *Proceedings of the 5th European Conference on Power Electronics and Applications,* Brighton, England, Sep. 13–16, vol. 4, pp. 102–109 (1993).

Prokisch, G.: "Die Zweifrequenzlokomotive Rh 1146 der Osterreichischen Bundesbahnen in Drehstromantriebstechnik", *Elektrische Bahnen eb,* Jg. 85, H. 11, pp. 367–372 (1987).

Salmon, J.C.: "Performance of a single–phase pwm boost rectifier using a hysteresis current controller", *Proceedings of the 4th European Conference on Power Electronics and Applications,* Firenze, Italy, Sep. 3–6, vol. 4, pp. 4–384 – 4–389 (1991).

Mohan, N., Undeland, T.M., and Robbins, W.P.: "Power Electronics: Converters, Applications and Design", *New York: John Wiley & Sons, Inc. (1989),* pp. 241–243 and 337–340 (1993).

Kassakian, J.G.: "High Frequencey Switching and Distributed Conversion in Power Electronic Systems", *Supplement to the Proceedings of the 6th Power Electronics and Motion Control Conference,* Oct. 1–3, Budapest, Hungary (1990).

Zhang, M.T., Jovanovic, M.M., and Lee, F.C.: "Analysis, Design and Evaluation of Forward Converter with Distributed Magnetics—Interleaving and Transformer Paralleling", *Proceedings of the 10th IEEE Applied Power Electronics Conference,* Dallas, TX, Mar. 5–9, pp. 315–321 (1995).

Lin, F., and Chen, D.Y.: "Reduction of Power Supply EMI Emission by Switching Frequency Modulation", *Proceedings of the 10th Annual VPEC Power Electronics Seminar,* Blacksburg, VA, Sep. 20–22, pp. 129–136 (1992).

Jiang, Y., and Lee, F.C.: "Three–Level Boost Converter for and its Application in Single–Phase Power Factor Correction", *Proceedings of the 12th Annual VPEC Power Electronics Seminar,* Blacksburg, VA, Sep. 11–13, pp. 127–133 (1994).

Koczara, W., and Bialoskorski, P.: "Modified Rectifiers with Unity Power Factor", *Proceedings of the 7th Power Electronics and Motion Control Conf.,* Sep. 20–22, Warsaw, Poland, vol. I, pp. 309–314 (1994).

McMurray, W.: "Modulation of the Chopping Frequency in DC Choppers and PWM Inverters Having Current–Hysteresis Controllers", *Record of the 14th IEEE Power Electronics Specialists Conference,* Albuquerque, Jun. 6–9, pp. 295–299 (1983).

SYNCHRONIZATION OF THE SWITCHING ACTION OF HYSTERESIS CURRENT CONTROLLED PARALLEL CONNECTED POWER ELECTRONICS SYSTEMS

This is a continuation of application Ser. No. 08/664,779, filed Jun. 14, 1996, abandoned.

BACKGROUND OF THE INVENTION

The invention relates to a method for synchronizing the operation of hysteresis current controlled parallel connected partial systems.

If high power density and high efficiency are required in a power electronics systems having a parallel connection of partial systems, it is advantageous for the partial systems to operate out-of-phase. By phase shifting the switching action of n partial systems by $2\pi/n$, the frequency of the ripple of the total current resulting as the sum of the partial currents is increased by a factor of n. Furthermore, a partial cancellation of current harmonics of the switching frequency is achieved and accordingly the amplitude of the ripple component of the total current is reduced. As compared to n=1 (i.e., to an application of a single system or phase-synchronized operation of the partial systems), for equal amplitude of the ripple of the total current, the switching frequency and/or the switching losses of the partial systems can be reduced and/or the efficiency of the energy conversion can be increased. Alternatively, for equal switching frequency, the inductance of the inductors of the partial systems and the circuitry for the filtering of the switching frequency harmonics of the total current can be reduced and/or the power density of the converter can be increased for equal efficiency.

Based on the prior art for the control of the partial systems, a constant pulse frequency is used because a fixed width of the pulse periods simplifies the synchronization of the partial systems and the definition of a phase displacement of the switching action of the systems. In order to synchronize the n partial systems, the switching action of these systems must be shifted by $2\pi/n$. In the simplest case, the switching instants and/or the pulse width modulated control signals of the partial systems are derived from the intersections of the output signal of a current controller which performs a local averaging and dynamic weighting of control error of the total current with phase shifted triangular signals. However, this basically uses a voltage to control the current. Therefore, for guaranteeing a symmetrical current consumption of the partial systems a separate control circuit has to be provided. A further drawback of this averaging method, however, is limited dynamic response of the current control due to the averaging of the control error. This makes it necessary to use a separate overcurrent protection circuit on the system and contributes to an increased complexity of the control circuit.

A direct control, balancing and limitation of the partial currents can be achieved with a low complexity circuit only by application of a current controller, for example, a hysteresis current controller. However, in this case, no direct possibility for synchronization and/or definition of a phase displacement of the switching action of the partial systems exists due to the changing switching frequency of this type of controller.

SUMMARY OF THE INVENTION

An aspect of the present invention is to provide a method and/or circuit which makes it possible to synchronize the switching action of hysteresis current controlled power electronics systems connected in parallel at a defined phase displacement.

The basic idea of the invention is to modify the input signals of the hysteresis current controllers, which are part of the on-off current controllers of the partial systems, by a coupling of the control circuits and/or of the power circuits of the systems, as compared to decoupled operation. In this manner, each change of a switching state of the partial system results in an increase or decrease of a given phase displacement of the control signals at the outputs of hysteresis elements, which are applied to the control inputs of the electronic switches of the partial systems.

The power circuit of a partial system based on the prior art, in general, includes an inductor connected between a terminal with an impressed voltage, which is defined by an outer system, and a connection with a voltage which is controlled by the corresponding current controller. The voltage of this connection is impressed by an electronic switching device whose control terminal is connected to the output of the hysteresis element of the associated hysteresis current controller. Depending on the switching state and/or on the voltage applied to the terminal of the inductor connected with the switching device there results an increase or decrease in inductor current. Thus, a tolerance band can be used to control a partial current of the partial system, if the control error of the partial system is applied to the input of the associated hysteresis element. The other partial systems, connected in parallel at the terminal with impressed voltage, have identical structure, equal width of the tolerance band and equal levels of the switched voltage but not necessarily equal current reference values.

For application of two partial systems starting with a small initial phase displacement, synchronization of the partial systems in opposite phase according to the present invention can be achieved by delaying the output signals of the hysteresis elements used for the controlling of the electronic switches and/or by delaying the change of the switching state of each system after the intersection of the upper or lower switching threshold of the associated hysteresis element has occurred. Furthermore, after the change of the switching state of the system with leading phase (denoted as leading system below) by a symmetric DC or high-pass coupling of the partial systems, the rate of rise of the input signal of the hysteresis element of the lagging system is increased for the time interval where the systems show different switching states. Because a change of the switching state is performed only after the delay time (which is triggered by the intersection of a switching threshold) has passed, the lagging system reaches a higher value of the current control error at its switching instant and the intersection of the following switching threshold is delayed accordingly. This causes an increase in phase displacement between the control signals of the electronic switches and/or of the phase displacement of the ripple components of the partial currents.

Due to the increase of the phase displacement at each intersection of a switching threshold after several changes of the switching states, operation of the two systems in opposite phase is realized and the current control errors of the systems simultaneously intersect opposite switching thresholds. Then, after each change of the switching state (until the next system changes over), no further increase of the phase difference of the control signals occur, and the switching actions of the partial systems remain locked in opposite phase.

An application of the method to a higher number of partial systems can be realized by applying the basic principle of the invention described above, where the possibility of a direct coupling of all partial systems or of subgroups consisting of two or more individual systems exists. For application of the concept according to the present invention to multiphase converter systems the parts of the parallel connected systems associated with a specific phase are to be considered as parallel systems in the sense of the above description. However, for optimizing the system performance a coupling of different phases can also be provided.

In a preferred embodiment, the coupling of the partial systems is achieved by inserting a coupling inductor between the branching point of the parallel connection of the partial systems and the terminal which receives the impressed voltage. In addition, time lag elements (realized in the simplest case by a low-pass filter and a Schmitt trigger connected in series) are inserted between the hysteresis elements realizing the switching boundaries of the tolerance band controls and the control inputs of the electronic switching devices. In this manner, the change of the switching state of the corresponding partial system and/or the inversion of the sign of the current change is performed only after the delay time has passed.

If the partial systems start with a small initial phase displacement of the ripple components of the partial currents and have the same switching state (that stage which results in a decrease of the currents), after the change of the switching state of the leading system due to the resulting increase of the associated partial current error, the potential of the branching point is decreased, and therefore, the rate of change of the current of the lagging system is increased. Therefore, within the delay interval following the intersection of the lower switching threshold, the lagging system reaches a higher absolute value of the current control error. Thus, the following intersection with the higher switching threshold is delayed accordingly and the phase displacement to the next switching state change of the leading system is increased. Due to the increase of the phase displacement at each change of a switching state, operation of the partial systems in opposite phase is attained when the partial currents simultaneously intersect switching thresholds with opposite sign.

In an alternate embodiment, the coupling inductor is realized by the mutual inductance of a magnetic coupling of the inductors of the partial systems. The equivalent circuit of this arrangement directly corresponds to the power circuit of the embodiment described above. Therefore, both embodiments are equivalent. However, an advantage of the magnetic coupling is a lower number of power components and the possibility of realizing coupling coefficients with positive or negative signs. Depending on the orientation of the windings of the inductors, the arrangement can be used for synchronizing the partial systems in phase or in opposite phase.

In a further embodiment, a signal used for the comparison with the reference value of a partial system is derived by summing and weighting the measured values of the partial currents such that for a required synchronization of the system in opposite phase, and for identical switching states of both systems, a change of the switching state of the leading system increases the rate of change of input signal of the hysteresis element of the lagging system. Thereby, in combination with the delay elements an increase of the control error of the system increases the phase displacement at each change of a switching state.

DETAILED DESCRIPTION OF THE PREFERRED EMBODIMENTS

Figure 1:
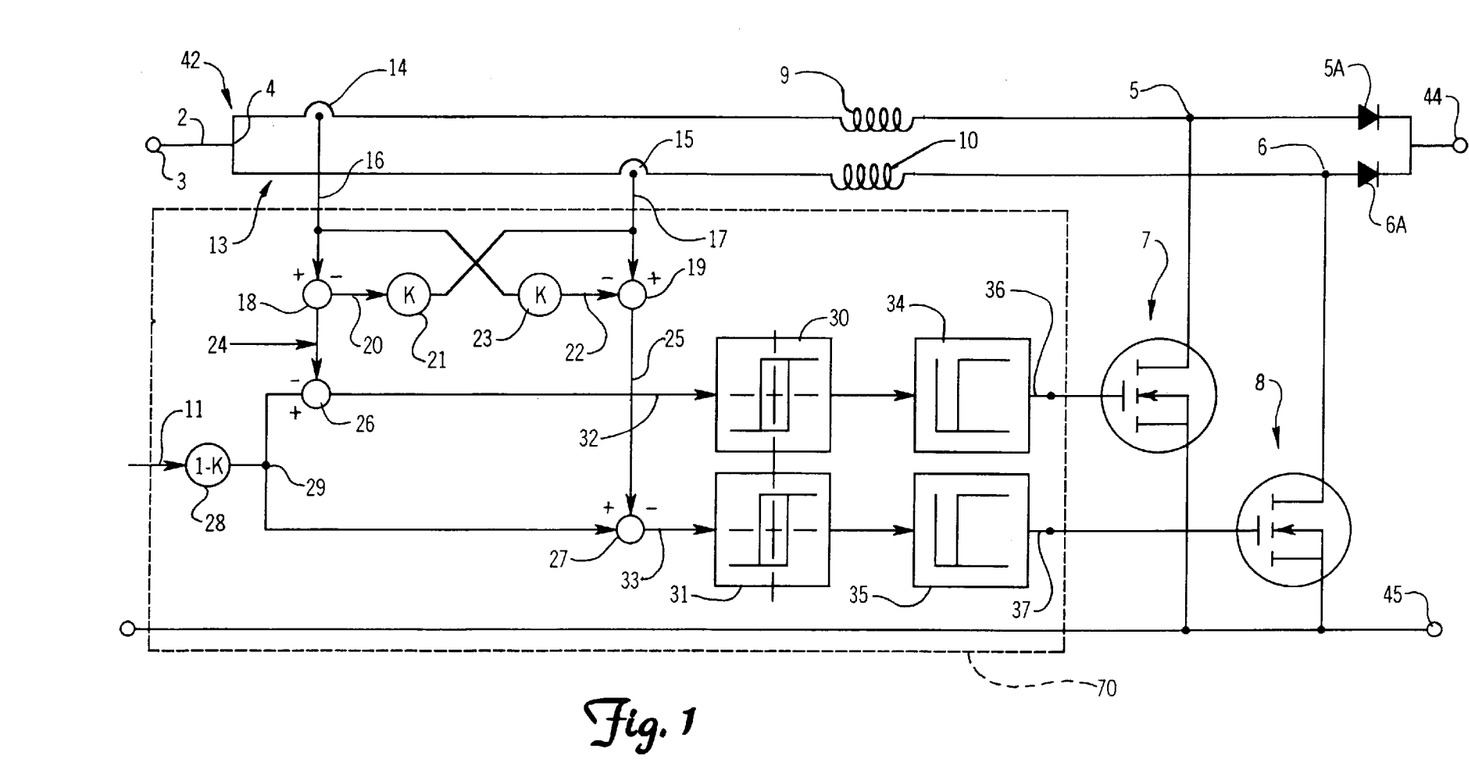
FIG. 1 is a schematic diagram of a first embodiment of the present invention.

The basic function of the system shown in FIG. 1, which in general is part of a power electronics system of higher complexity, is the control of the currents flowing in inductors 9 and 10 in accordance with a reference value 11 and the synchronization of the switching action of partial systems 12 and 13 in opposite phase. The reference value 11 is defined by the control of an outer system or by an external adjustment unit. The inductors 9 and 10 are connected between a branching point 4 which is connected to a terminal 3 of the outer system having an impressed potential via a connecting lead 2 and terminals 5 and 6 of electronic switching devices 7 and 8, respectively.

For realizing current control, transducers 14 and 15 are provided for sensing the currents in the inductors 9 and 10. The measured values 16 and 17 are applied to summing junctions 18 and 19. A second input 20 of summing junction 18 is derived from measured value 17 of partial system 13 by a gain element 21. Similarly, a second input 22 of summing junction 19 is derived from measured value 16 of partial system 12 by a gain element 23. Thereby, a symmetric control oriented coupling of the current control loops of the partial systems 12 and 13 is realized. Output signals 24 and 25 of summing junctions 18 and 19 are applied to summing junctions 26 and 27, respectively. A second input 29 of both junctions 26 and 27 is derived from the reference value 11 via a gain element 28. The summing junctions 26 and 27 generate the control error signals 32 and 33 of the partial systems 12 and 13, which are applied to the inputs of hysteresis switching element signals 30 and 31. Because the control error signals 32 and 33 are composed of a weighted sum of the current control errors of both partial systems 12 and 13, the control of each partial system 12 and 13 is dependent on the values of both partial currents flowing in inductors 9 and 10. The current control loops of the partial systems 12 and 13 are closed by applying the output signals of the hysteresis switching elements 30 and 31 to the control inputs 36 and 37 of the electronic switching devices 7 and 8 via time lag elements 34 and 35. Diodes 5A and 6A are connected to terminal 44 of the outer system and to nodes 5 and 6. Switching devices 7 and 8 connect terminal 45 to nodes 5 and 6. This construction allows increases or decreases in the partial currents by proper control of the electronic switching devices 7 and 8 and control of the partial currents in accordance with the time behavior of the reference value 11.

Figure 2:
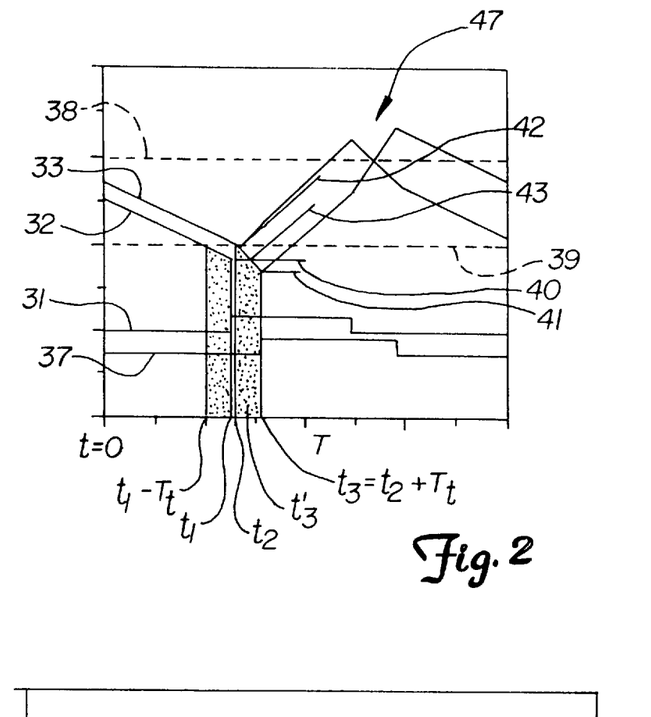
FIG. 2 is a waveform diagram of the signals appearing at the inputs of the hysteresis elements and the switching devices of the circuit shown in FIG. 1.

For a clear explanation of the operating principle of the circuit shown in FIG. 1, FIG. 2 illustrates the time behavior of the control error input signals 32 and 33 of the hysteresis switching elements 30 and 31 and the associated signals 36 and 37 applied to the control terminals of the electronic switching devices 7 and 8. In FIG. 2, a higher switching threshold 38 and a lower switching threshold 39 of the hysteresis switching elements 30 and 31 are indicated by dashed lines. If there exists at t=0, a switching state of the electronics switches 7 and 8 such that the control errors 32 and 33 are decreasing (where due to the symmetry of the coupling of the partial systems 12 and 13 the control error signals 32 and 33 show the same rate of change) at time $t_1-T_t$, the leading system 12 intersects the lower switching threshold 39. This results in a change of the switching state of the hysteresis element 30 which, however, takes effect on the electronic switching device 7 only after the delay time 34 (associated delay interval of width $T_t$ marked in FIG. 2 by a dotted area) has passed. Therefore, the switch over of the leading system 12 is performed not before time $t_1$, but later, at a level 40 of control error signal 32.

Accordingly, switching device 7 is turned on and the control error signal 32 is guided back into the tolerance band. Due to the change of the sign of the slope of control error signal 32 via coupling element 23, the absolute value of the rate of change of the control error signal 33 of the lagging system 13 is increased in the time interval $t_2$ to $t_2+T_t$. Subsequently, within a delay interval defined by timing element 35 following the intersection of the control error signal 33 with the lower switching threshold 39 at time $t_2$, the control error signal 33 goes below the lower switching threshold 39. At time $t_2+T_t$, an absolute value 41 of control error signal 33 is higher than level 40. Upon comparison with a subsequent switch region 47, it can be seen that the phase displacement of the control signals 36 and 37 is increased. For maintaining the phase displacement existing at t=0, the change of the switching state of the partial system 13 would have had to take place at t=t'$_3$. This would result in a time response indicated by lines 42 and 43 of the control error signals 32 and 33. However, this is prevented by timing element 35 and its associated delay interval [$t_2$, $t_2+T_t$], indicated in FIG. 2 by a dotted area.

Figure 3:
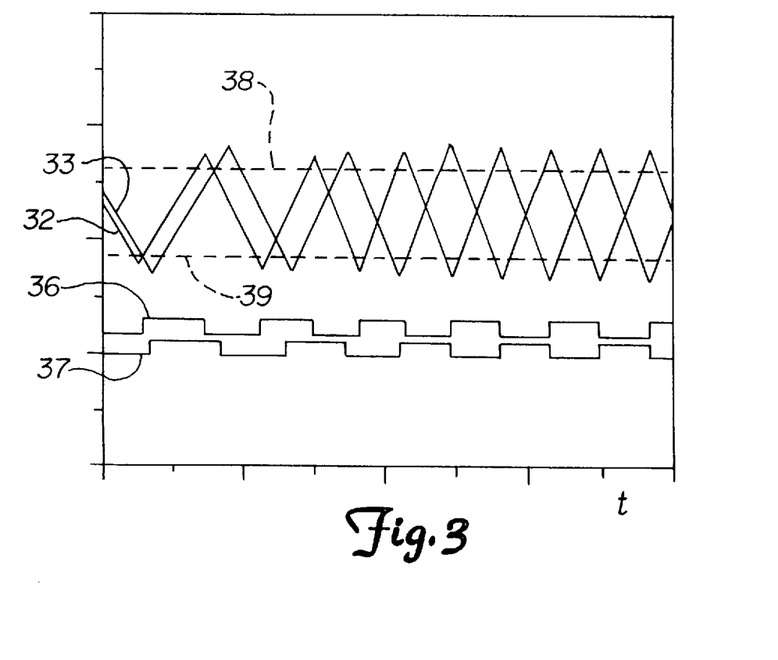
FIG. 3 is a waveform diagram illustrating synchronization of the partial systems in opposite phase.

The phase displacement of the control signals 36 and 37 is increased at each change of a switching state until consecutive switching state changes of the partial systems 12 and 13 occur at opposite switching thresholds as illustrated in FIG. 3. Then both partial systems 12 and 13 show the same switching state before a switch over occurs. Therefore, the control error signals 32 and 33 show the same rate of change when crossing a switching threshold and no further increase of the phase displacement occurs. In other words, by combining a control oriented coupling and a delay of the control signals 36 and 37 of the electronic switching devices 7 and 8 according to the present invention a self-adjusting operation of the partial systems 12 and 13 in opposite phase is achieved.

The amount of coupling between partial systems 12 and 13 is determined by the gain of gain elements 21 and 22 (represented herein by K) and gain element 28 (represented by 1−K). In a preferred embodiment, K equals 0.16. Based on the above description, it is obvious that by changing the signs of the inputs of summing junctions 26 and 27 for signals 20 and 22 or of the gain K of the coupling elements 21 and 23, operation of the partial systems 12 and 13 in phase can be achieved.

A second embodiment of the present invention achieves the coupling of the partial systems 12 and 13 via the power circuit instead of through the control circuit described above. In this embodiment, the interconnecting lead 2 includes a coupling inductor 60. In this case, the control error signals 32 and 33 show an identical time behavior as compared to the control oriented coupling (shown in FIG. 1). This results basically in an identical operating behavior of the circuits. However, due to the fixed positive sign of the couplings between the partial systems 12 and 13, only an operation of the partial systems 12 and 13 in opposite phase can be achieved.

In a further embodiment, a magnetic coupling M of the inductors 9 and 10 of the partial systems 12 and 13 is introduced, and the coupling inductor 60 can be removed. Therefore, the complexity of the system is decreased. In this embodiment, M can be positive or negative by simply changing the orientation of one of the magnetically coupled windings. Therefore, in this embodiment, one can decide between operating the partial systems 12 and 13 in phase or in opposite phase.

Figure 5:
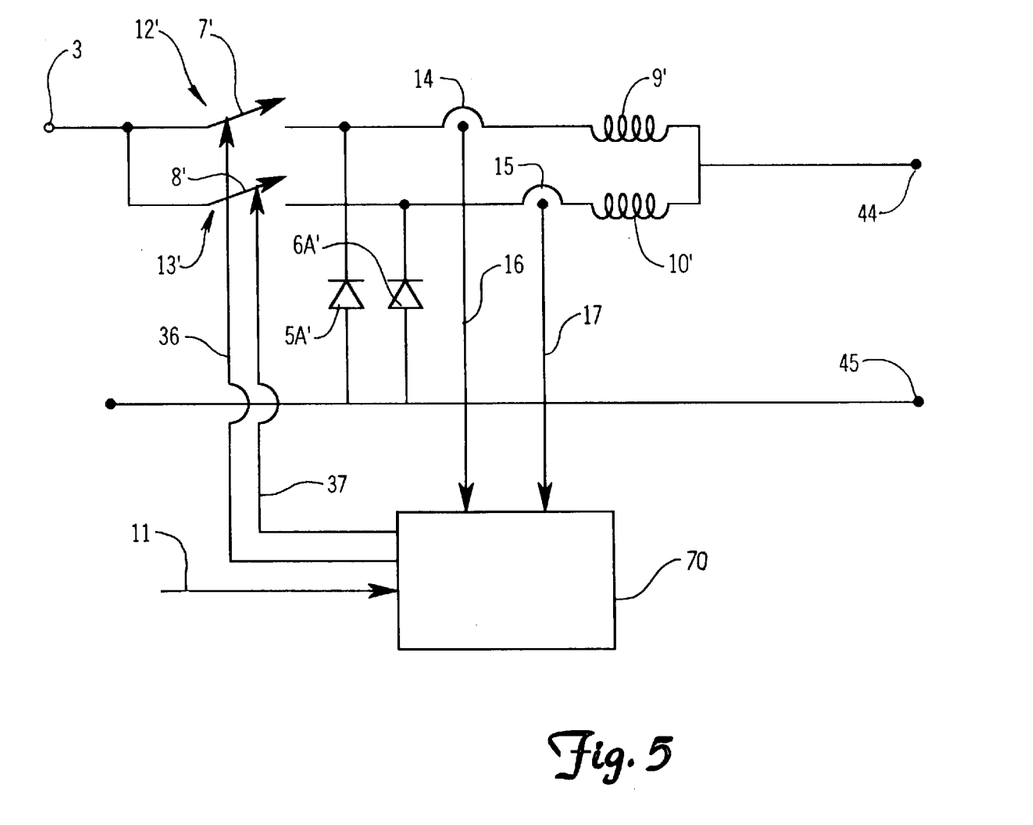
FIG. 5 is a schematic diagram of a third embodiment of the present invention.
Figure 6:
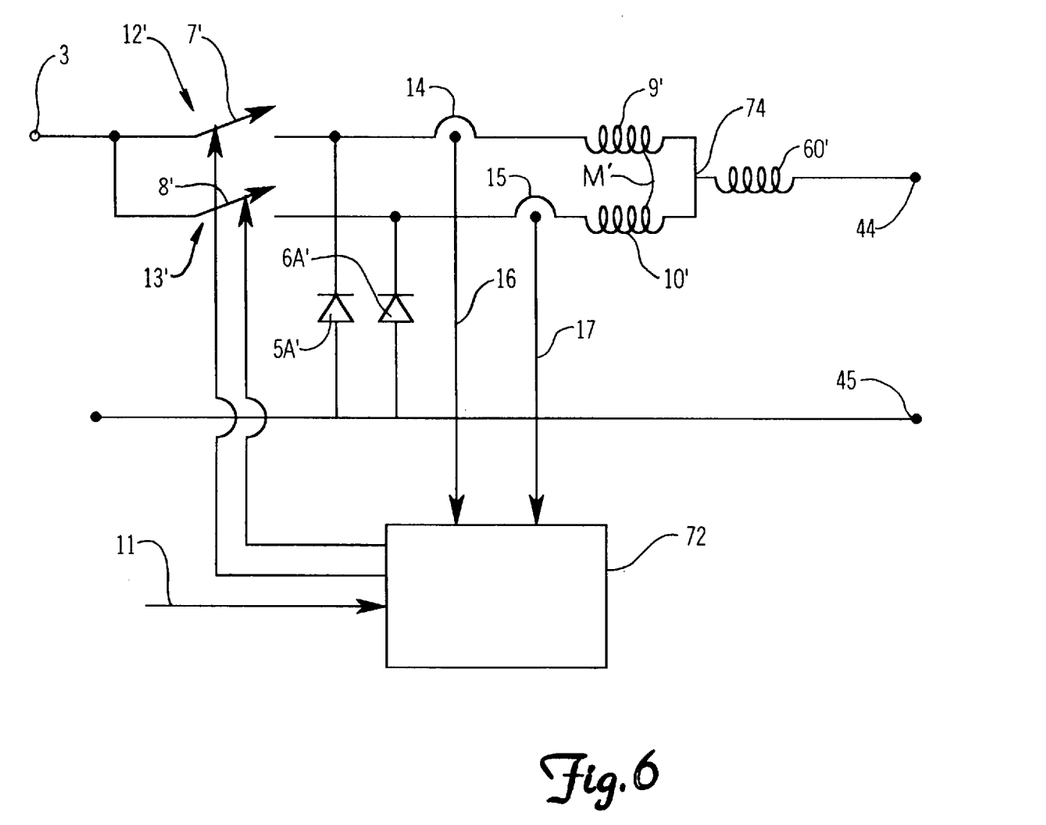
FIG. 6 is a schematic diagram of a fourth embodiment of the present invention.

In FIGS. 1 and 2, the diode 5A, the switching device 7 and the inductor 9 of partial system 12 are connected between terminals 3, 44 and 45, as a boost converter. Similarly, the diode 6A, the switching device 8 and the inductor 10 of the partial system 13 also forms a boost converter and is connected in parallel with the partial system 12. FIGS. 5 and 6 illustrate application of the present invention to buck converters.

In FIG. 5, a partial system 12' forms a buck converter between terminals 3, 44 and 45 and includes a diode 5A', a switching device 7', and an inductor 9'. A partial system 13' is connected in parallel with the partial system 12' and includes a diode 6A', a switching device 8' and an inductor 10'. A control circuit 70 receives as an input the reference value 11 and the measured values 16 and 17 indicative of the currents flowing in inductors 9' and 10', respectively. The measured values 16 and 17 are obtained from transducers 14 and 15. The control circuit 70 is identical to that illustrated in the circuit of FIG. 1 as indicated with a dashed box and provides control inputs 36 and 37 to the switching devices 7' and 8' in order to operate the partial systems 12' and 13' in opposite phase.

Figure 4:
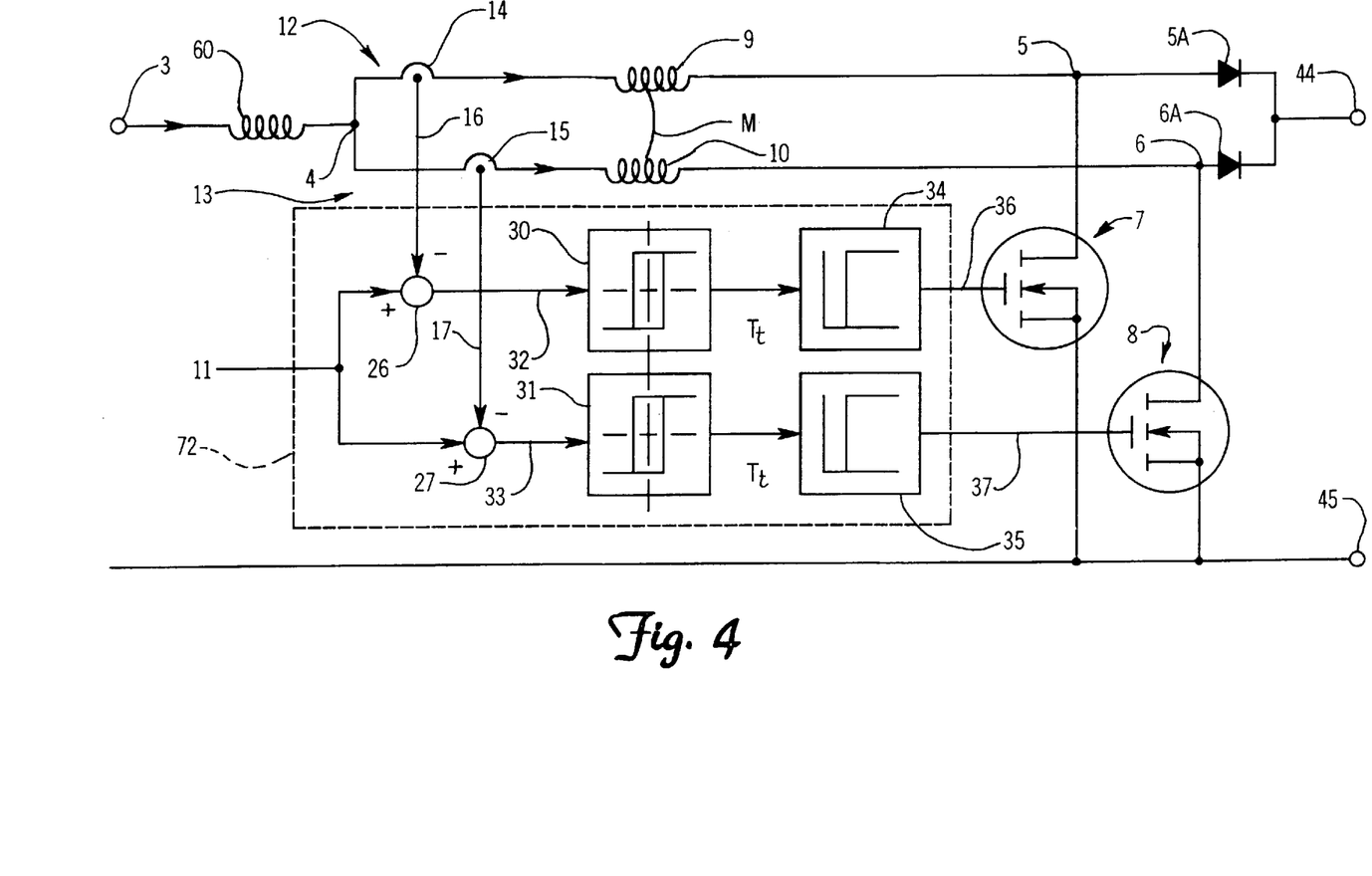
FIG. 4 is a schematic diagram of a second embodiment of the present invention.

FIG. 6 illustrates the coupling of the partial systems 12' and 13' via the power circuit instead of through the control circuit 70. In this embodiment, a coupling inductor 60' is connected in series between a common node 74 of the inductors 9' and 10' and the terminal 44. A control circuit 72 is identical to that used in the second embodiment and is identified in FIG. 4 with a dashed box. The control circuit 72 of the embodiment illustrated in FIG. 6 receives the reference value 11 and the measured value 16 and 17 of the currents flowing through the inductors 9' and 10'. The control circuit 72 provides the control inputs 36 and 37 to the switching devices 7' and 8', respectively, to operate the partial systems 12' and 13' in opposite phase. If desired, the coupling inductor 60' can be removed and a magnetic coupling M' (mutual inductance) can be established between the inductors 9' and 10'.

Figure 7:
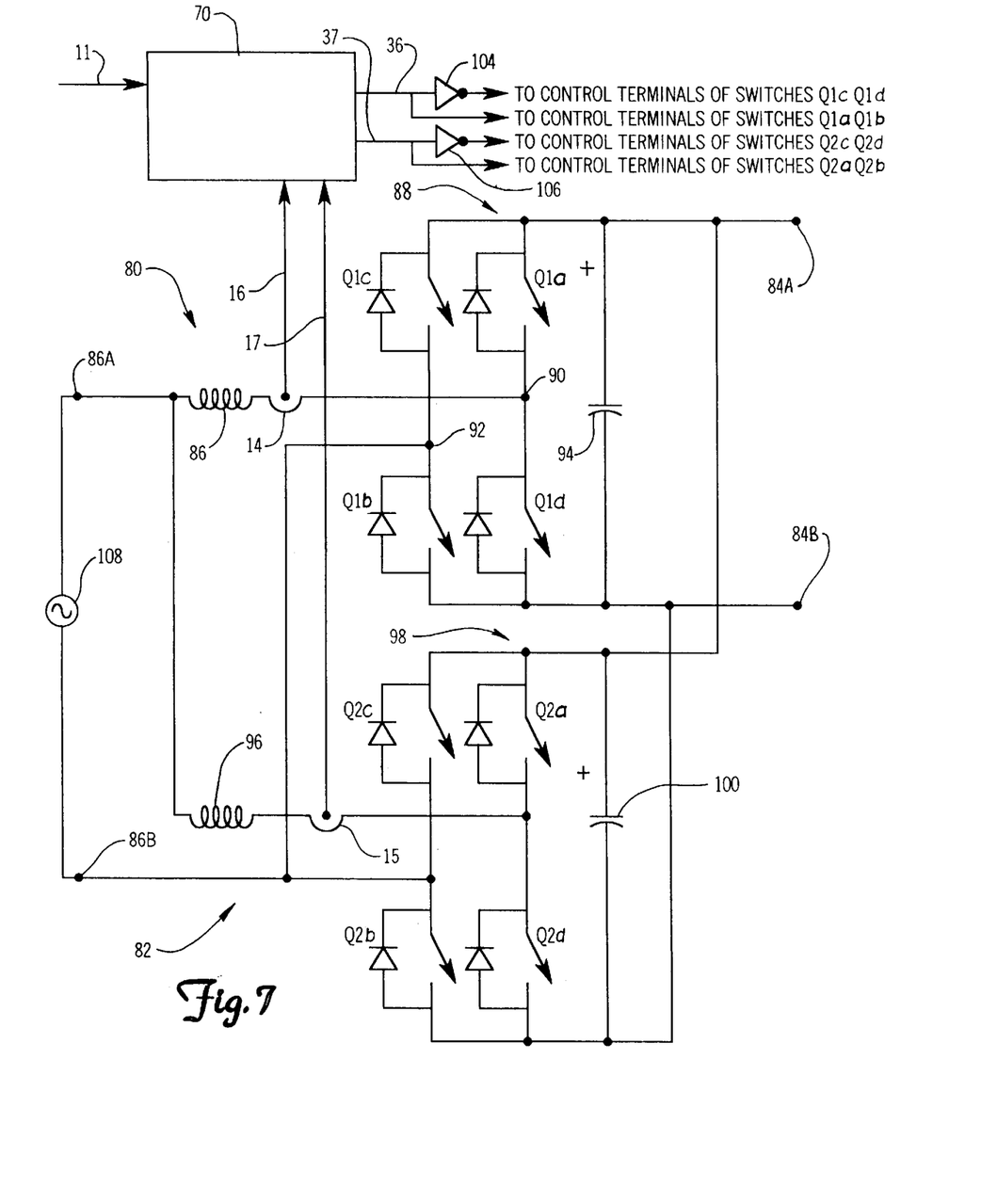
FIG. 7 is a schematic diagram of a fifth embodiment of the present invention.

In the embodiment illustrated in FIG. 7, parallel connected partial systems 82 and 83 provide bidirectional power flow conversion between DC terminals 84A, 84B and AC terminals 86A, 86B. The partial system 80 includes an inductor 86 and electronic switches designated $Q_{1a}$, $Q_{1b}$, $Q_{1c}$ and $Q_{1d}$ connected in a H-bridge assembly designated generally at 88. As illustrated, a common node 90 between electronic switches $Q_{1a}$ and $Q_{1d}$ is connected to the inductor 86, while a common node 92 between electronic switches $Q_{1b}$ and $Q_{1c}$ is connected to terminal 86B. A filter capacitor 94 is connected across the H-bridge assembly 88 and the DC terminals 84A and 84B. The partial system 82 is identical to the partial system 80 and includes inductor 96, a H-bridge assembly 98 comprising electronic switches $Q_{2a}$, $Q_{2b}$, $Q_{2c}$ and $Q_{2d}$, and a filter capacitor 100.

The control circuit 70 receives the reference value 11 and measured value 16 and 17 indicative of the currents flowing through the inductors 86 and 96, respectively, as measured by the transducers 14 and 15, respectively. The control circuit 70 provides the control inputs 36 and 37 that control operation of the switches in the H-bridge assemblies 88 and 98. As illustrated, the control input 36 is provided to the control terminals of switches $Q_{1a}$ and $Q_{1b}$, while a complimentary control signal control input 36 is obtained via an inverter 104 and provided to the control terminals of switches $Q_{1c}$ and $Q_{1d}$. Similarly, the control input 37 is provided to the control terminals of switches $Q_{2a}$ and $Q_{2b}$, while a complimentary control signal of control input 37 is obtained via an inverter 106 and provided to the control terminals of switches $Q_{2c}$ and $Q_{2d}$.

The embodiment illustrated in FIG. 7 can be operated to convert AC power from an AC source 108, for example, a utility system grid, to DC power provided at terminals 84A and 84B. Alternatively, the system can be operated to convert DC power at terminals 84A and 84B to AC power provided at terminals 86A and 86B. In either case, control circuit 70 operates the partial systems 80 and 82 to provide currents through inductors 86 and 96 in opposite phase, as discussed above with the previous embodiments. Operation of the partial systems 80 and 82 in opposite phase increases the frequency of the ripple in the current drawn from or provided to the AC source 108 as well as reduces the amplitude of the ripple.

Figure 8:
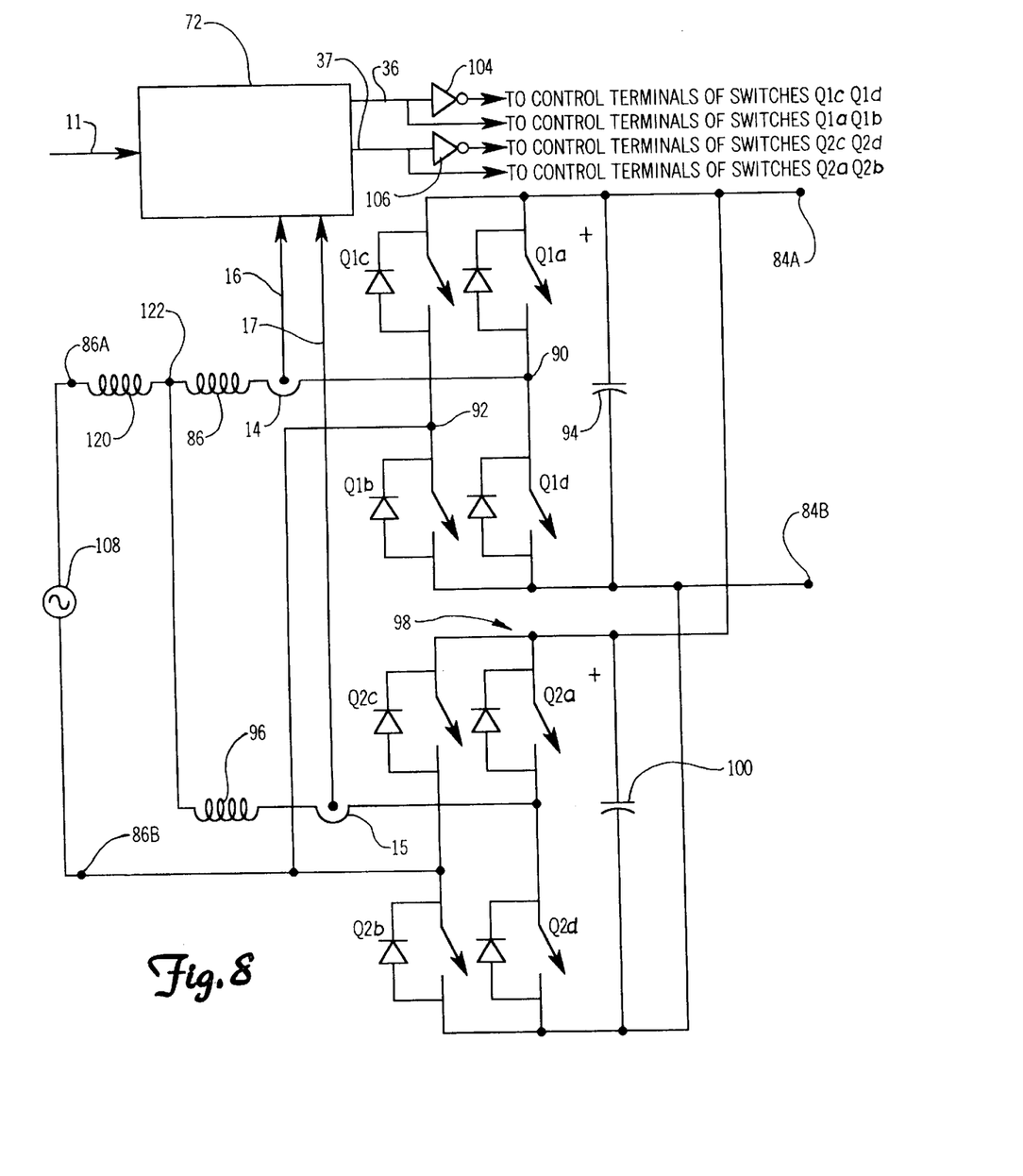
FIG. 8 is a schematic diagram of a sixth embodiment of the present invention.

In the embodiment illustrated in FIG. 8, coupling of the partial systems 80 and 82 is via the power circuit instead of through the control circuit described above. In this embodiment, a coupling inductor 120 is connected in series between terminal 86A and a common node 122 formed between inductors 86 and 96. The embodiment illustrated in FIG. 8 operates identical to the embodiment illustrated in FIG. 7; however, the control circuit 72 generates the control inputs 36 and 37.

Although the present invention has been described with reference to preferred embodiments, workers skilled in the art will recognize that changes may be made in form and detail without departing from the spirit and scope of the invention.

What is claimed is:

1. A power conversion system comprising:

first and second partial systems connected in parallel to a first set of terminals for receiving electrical power and a second set of terminals for providing electrical power, each partial system including an inductor through which current flows from a terminal of the first set of terminals to a terminal of the second set of terminals, and an electronic switch for controlling electrical power provided at the second set of terminals; and a control circuit for controlling operation of the electronic switches, the control circuit comprising:

means for generating a first control signal error and a second control signal error, each control signal error being a function of a reference value and current flowing in the inductors;

hysteresis means for receiving the first control signal error and the second control signal error and providing a first output and a second output, respectively, upon intersection of the first control signal error and the second control signal error with selected threshold values;

delay means coupled to the electronic switches for receiving and delaying transmission of the first output and the second output to the electronic switches.

2. The power conversion system of claim 1 wherein the means for generating includes a circuit for receiving representative signals of the current flowing in each of the inductors and summing said representative signals with the reference value.

3. The power conversion system of claim 1 wherein the means for generating includes common inductor connected to a common node formed between each of inductors of the partial systems.

4. The power conversion system of claim 1 wherein the means for generating includes a magnetic coupling between the inductors of the partial systems.

5. The power conversion system of claim 1 wherein each partial system comprises a boost converter.

6. The power conversion system of claim 1 wherein each partial system comprises a buck converter.

7. The power conversion system of claim 1 wherein each partial system comprises a bidirectional power converter.

8. A method of operating an electrical power conversion system having first and second partial systems connected in parallel to a first set of terminals for receiving electrical power and a second set of terminals for providing electrical power, each partial system including an inductor through which current flows from a terminal of the first set of terminals to a terminal of the second set of terminals, and an electronic switch for controlling electrical power provided at the second set of terminals, the method comprising the steps of:

generating a first control signal error and a second control signal error, each control signal error being a function of a reference value and current flowing in the inductors;

generating a first output and a second output upon intersection of the first control signal error and the second control signal error, respectively, with selected threshold values;

delaying transmission of the first output and the second output to the electronic switches so as to change a phase displacement between the first control signal error and the second control signal error; and repeating the steps of generating a first control signal error and a second control signal error, generating a first output and a second output and delaying transmission of the first output and the second output to the electronic until a desired phase relationship is obtained between the first control signal error and the second control signal error.

9. The method of claim 8 wherein the change of phase displacement is an increase in phase displacement and the desired phase relationship is that the first control signal error and the second control signal error are in opposite phase.

10. The method of claim 8 wherein the change of phase displacement is a decrease in phase displacement and the desired phase relationship is that the first control signal error and the second control signal error are in phase.

* * * * *

UNITED STATES PATENT AND TRADEMARK OFFICE
CERTIFICATE OF CORRECTION

PATENT NO. : 5,892,352
DATED : April 6, 1999
INVENTOR(S) : Kolar et al.

It is certified that error appears in the above-identified patent and that said Letters Patent is hereby corrected as shown below:

Column 8, line 4, after ";" insert --and--.

Column 8, line 14, after "includes" insert --a--.

Column 8, line 53, before "until" insert --switches--.

Signed and Sealed this

Eleventh Day of July, 2000

Attest:

Q. TODD DICKINSON

*Attesting Officer*     *Director of Patents and Trademarks*